(12) United States Patent
Fabris et al.

(10) Patent No.: US 11,914,134 B2
(45) Date of Patent: Feb. 27, 2024

(54) MICROSCOPE SYSTEM FOR IMAGING A SAMPLE REGION AND CORRESPONDING METHOD

(71) Applicants: LEICA MICROSYSTEMS CMS GMBH, Wetzlar (DE); LEICA INSTRUMENTS (SINGAPORE) PTE. LTD., Singapore (SG)

(72) Inventors: Stefan Fabris, Schwalmstadt (DE); Jozsef Attila Gombos, Heerbrugg (CH)

(73) Assignees: LEICA MICROSYSTEMS CMS GMBH, Wetzlar (DE); LEICA INSTRUMENTS (SINGAPORE) PTE. LTD., Singapore (SG)

( * ) Notice: Subject to any disclaimer, the term of this patent is extended or adjusted under 35 U.S.C. 154(b) by 160 days.

(21) Appl. No.: 17/289,254

(22) PCT Filed: Oct. 29, 2019

(86) PCT No.: PCT/EP2019/079523
§ 371 (c)(1),
(2) Date: Apr. 28, 2021

(87) PCT Pub. No.: WO2020/089223
PCT Pub. Date: May 7, 2020

(65) Prior Publication Data
US 2021/0396984 A1 Dec. 23, 2021

(30) Foreign Application Priority Data
Oct. 30, 2018 (DE) ..................... 10 2018 127 076.3

(51) Int. Cl.
*G02B 21/36* (2006.01)
*G02B 21/26* (2006.01)
*G06F 3/04847* (2022.01)

(52) U.S. Cl.
CPC .......... *G02B 21/368* (2013.01); *G02B 21/26* (2013.01); *G02B 21/365* (2013.01); *G06F 3/04847* (2013.01)

(58) Field of Classification Search
None
See application file for complete search history.

(56) References Cited

U.S. PATENT DOCUMENTS

2002/0060285 A1 5/2002 Engelhardt et al.
2002/0158966 A1* 10/2002 Olschewski ............. G01B 9/04
348/79
(Continued)

FOREIGN PATENT DOCUMENTS

DE 10058100 A1 6/2002
DE 102012021726 A1 5/2014
(Continued)

OTHER PUBLICATIONS

Zuschratter, Werner et al.: "Acquisition of multiple image stacks with a confocal laser scanning microscope". IN: Proc. SPIE vol. 3261, Three-Dimensional and Multidimensional Microscopy: Image Acquisition and Processing V, Jun. 9, 1998; doi: 10.1117/12.310551, pp. 177-186, SPIE, US.
(Continued)

*Primary Examiner* — Heather R Jones
(74) *Attorney, Agent, or Firm* — Leydig, Voit & Mayer, Ltd.

(57) ABSTRACT

A microscope system for imaging at least one region of a sample includes: an image generating unit for microscopic imaging of a section of a sample region to be imaged acquired in an observation beam path; a movement unit for moving the section to be imaged into the observation beam path of the image generating unit; a graphic user interface displayed on a display for establishing a movement range corresponding to the sample region to be imaged by way of
(Continued)

at least one user input, the graphic user interface displaying a coordinate system and, after input of at least one point in the displayed coordinate system, the movement range is established as a defined movement volume; and a control unit for activating the movement unit as a function of the defined movement volume so as to approach a set of sections corresponding to the defined movement volume in succession.

29 Claims, 5 Drawing Sheets

(56) References Cited

U.S. PATENT DOCUMENTS

| | | | |
|---|---|---|---|
| 2004/0109169 A1* | 6/2004 | Olschewski | G02B 21/365 356/609 |
| 2005/0280818 A1 | 12/2005 | Yamashita et al. | |
| 2017/0278259 A1* | 9/2017 | Hattori | G02B 21/367 |

FOREIGN PATENT DOCUMENTS

| | | | |
|---|---|---|---|
| DE | 10108240 B4 | 6/2018 | |
| JP | H07333522 A | 12/1995 | |
| JP | 2006003805 A | 1/2006 | |
| JP | 2006023476 A | 1/2006 | |
| WO | WO-02052393 A1 * | 7/2002 | G02B 21/32 |

OTHER PUBLICATIONS

Nikon: "NIS-Elements AR (Advanced Research)," Manual, (V.4. 50.00), Sep. 2015, pp. 1-246, Laboratory Imaging, spol. s.r.o., Prague, Czech Republic.

Pinkard, Henry et al.: "Micro-Magellan: open-source, sample-adaptive, acquisition software for optical microscopy," Nature Methods, Oct. 2016, pp. 1-24, Nature America, Inc., US.

Perkinelmer: "Volocity User Guide", Sep. 30, 2011, pp. 1-536, Improvision, A PerkinElmer Company, UK.

* cited by examiner

MICROSCOPE SYSTEM FOR IMAGING A SAMPLE REGION AND CORRESPONDING METHOD

CROSS-REFERENCE TO PRIOR APPLICATIONS

This application is a U.S. National Phase application under 35 U.S.C. § 371 of International Application No. PCT/EP2019/079523, filed on Oct. 29, 2019, and claims benefit to German Patent Application No. DE 10 2018 127 076.3, filed on Oct. 30, 2018. The International Application was published in German on May 7, 2020 as WO 2020/089223 under PCT Article 21(2).

FIELD

The present invention relates to a microscope system for imaging at least one region of a sample using an image generating unit for microscopic imaging of a section of the sample region to be imaged located in a focus of an observation beam path, a movement unit or scanning unit, which is configured to move the section to be imaged into the focus of the observation beam path of the image generating unit, and a control unit which activates the movement unit as a function of a movement range (scanning range) to be defined in such a way that a predetermined set of sections is approached within the defined movement range and imaged by the image generating unit.

BACKGROUND

Such microscope systems are generally known from the prior art. They are used, for example, if a sample or the sample region to be imaged exceeds the dimensions which a microscopic image can acquire in the field of view of the imaging optical unit. An overview image of a part of the sample can frequently be generated at low magnification. A user then selects, for example, the sample region of interest, which is then traveled or scanned according to a defined pattern. In this case, the sample region to be imaged is imaged in that a predetermined set of sections is approached and imaged according to the predetermined scanning pattern, wherein subsequently the generated images are superimposed by a suitable image processing program and compiled to form an overall image (mosaic image) of the sample region. In general, the sample region to be imaged is a sample volume which extends in the x, y, and z directions. The sample region is usually scanned in multiple x-y planes at different z coordinates. For this purpose, the microscope system generally has a microscope table movable in the x and y directions, as well as a focusing unit which can vary or establish the focus of the observation beam path of the microscope system in the z direction. The objective of the microscope system and/or the mentioned microscope table is movable in the z direction for the purposes of focusing.

In such known microscope systems, establishing the sample region to be imaged or the associated movement range (scanning range) frequently proves to be problematic and not user-friendly. Up to this point, for example, the scanning range is established by sliders, using which the scanning ranges can be defined in the x, y, and z directions. If the scanning range is selected to be excessively large, regions are comprised by the image in which either no sample is present or sample regions not of interest are located. Both increase the effort and the duration of the image acquisition. If the scanning ranges are selected to be excessively small, there is the risk of not having sample volumes of interest completely imaged.

SUMMARY

In an embodiment, the present invention provides a microscope system for imaging at least one region of a sample, comprising: an image generating unit for microscopic imaging of a section of a sample region to be imaged acquired in an observation beam path; a movement unit configured to move the section to be imaged into the observation beam path of the image generating unit; a graphic user interface displayed on a display for establishing a movement range corresponding to the sample region to be imaged by way of at least one user input, the graphic user interface being configured to display a coordinate system and, after input of at least one point in the displayed coordinate system, the movement range is established as a defined movement volume; and a control unit configured to activate the movement unit as a function of the defined movement volume so as to approach a set of sections corresponding to the defined movement volume in succession in the observation beam path and the sections are each imaged by the image generating unit.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
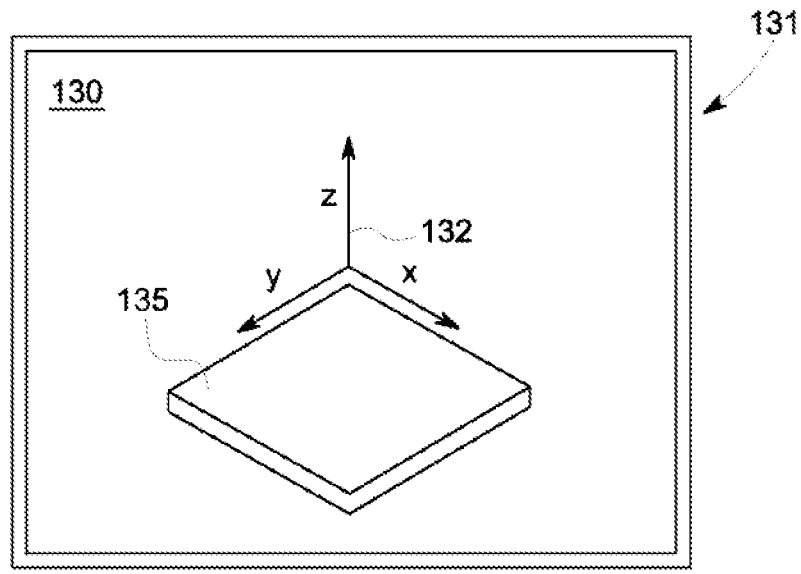
FIG. 1 schematically shows at least one detail of a graphic user interface of a microscope system according to the invention in a first view.

In an embodiment, the present invention provides an option for being able to establish the movement range or scanning range corresponding to the sample region to be imaged in a more precise and user-friendly manner.

The microscope system according to the invention is a microscope system of the type mentioned at the outset. For imaging at least one region of a sample, the microscope system includes an image generating unit for microscopic imaging of a section of the sample region to be imaged located in a focus of an observation beam path. Such an image generating unit comprises, for example, at least one microscope objective, a magnification changer, and/or a zoom system and also generally a lens barrel having camera connected downstream. Microscopes without lens barrels are also known. The microscope image can thus be imaged directly on an image sensor, for example. In this way, in a known manner, a section located in the observation beam path can be microscopically imaged. Furthermore, the microscope system includes a movement unit or scanning unit, which is configured to move the respective section to be imaged into the observation beam path of the mentioned image generating unit. For this purpose, the microscope table bearing the sample is moved and/or the focusing unit of the microscope system is adjusted accordingly. The objective and/or the microscope table is movable in the focus direction for the purposes of the focusing. In this way, a section to be imaged can be approached in all three spatial directions and imaged by the image generating unit. The sections moved into the observation beam path are advantageously arranged in a focus of the image generating unit.

The microscope system according to the invention furthermore includes a graphic user interface, which is displayed on a display and is used to establish a movement range or scanning range corresponding to the sample region to be imaged by way of at least one user input.

A "graphic user interface" can be understood here as a graphic display generated by a program. A user can perform an input of instructions to the microscope system thereon. The instructions are converted into actions of the microscope system. The input by the user takes place directly in the display, for example by moving a cursor and clicking or selecting desired positions. If the display is a touch-sensitive or capacitive display screen ("touchscreen"), the input can be carried out using a finger or an input stylus matching with the display screen.

The graphic user interface is configured in such a way that it displays a coordinate system and the movement range is defined in the form of a movement volume by input of at least one point in the coordinate system. As a function of the defined movement volume, the control unit of the microscope system activates the movement unit in such a way that a predetermined set of sections is approached within the defined movement volume and imaged by the image generating unit. In other words, a set of sections corresponding to the movement volume is approached in succession in the observation beam path and the sections are each imaged. The images of the sections generated in this way are superimposed and compiled in a known manner to obtain an image of the sample region to be imaged. The number and positions of the sections within the volume are based on the required image quality of this image.

The graphic user interface is at least configured in such a way that a user can establish or define the movement range corresponding to the imaging of the desired sample region. For this purpose, a coordinate system is displayed on the graphic user interface, within which the user can define a movement or scanning volume by inputting one or more points. The movement range defined in this manner is displayed by the user interface, for example, in the form of a fixedly outlined movement volume. After confirming the defined movement volume, the scan with the respective image generation then takes place, for example. For this purpose, for example, the graphic user interface can be connected to a processing unit, which is designed to generate signals which are given to the control unit. However, such a processing unit can also be provided separately, for example, in the display or on a graphic card.

It is particularly advantageous here if at least one, but in particular each of the points to be input by the user is located on or in the sample region to be imaged. It is particularly expedient here if a user defines three points in succession, which represent boundary points of the sample region to be imaged. By selecting at least three such points in the space, a corresponding sample volume can be selected and the corresponding movement range can be defined as the movement volume and displayed using the graphic user interface. The scanning subsequently takes place within the defined movement volume with respective image generation.

Without restriction of the generality, it is to be presumed hereinafter that the displayed coordinate system is a Cartesian coordinate system in the x, y, and z directions. By selecting at least three points in such a coordinate system—if at least one of these points is not in the same plane as the other points—a three-dimensional movement volume can be defined. Again without restriction of the generality, a cuboid movement volume is to be presumed. Of course, other movement volumes may also be defined in a Cartesian coordinate system when at least three points are established. Furthermore, this can also be based on another coordinate system, such as a spherical or cylinder coordinate system. When reference is made hereinafter to x, y, z coordinates, this is not to restrict the general concept of the invention. This also applies to the shape of the defined movement volumes.

A first advantageous option for the definition of a cuboid movement range is described hereinafter.

In the displayed coordinate system, first a first point A and a second point B in a common x-y plane are input from the graphic user interface. The point A is advantageously the present focus position, wherein the point A forms a boundary point or limiting value of the movement range to be defined. Subsequently, the sample is moved further by moving the microscope table in the x-y plane up to a second limiting value B, which the user confirms, for example, by a suitable input via a button or by mouse click. The graphic user interface is configured in such a way that a predefined rectangular movement range is defined, wherein the points A and B form boundary points or limiting values of this movement range. It is expedient in particular if the points A and B form corner points opposite to one another of the rectangular movement range. In principle, an image scan can already be performed on the basis of the definition of the rectangular movement range, which is then restricted to the selected x-y plane, however. To define a movement volume, the user inputs a third point C in the same displayed coordinate system, which is located outside the x-y plane extending through the points A and B. In an advantageous manner, the graphic user interface is configured in such a way that the input third point C forms a boundary point of the in particular cuboid movement range. The point C is located, for example, in a plane which is opposite to the plane spanned by the points A and B and extends in parallel thereto. The point C is advantageously located on or in the sample region to be imaged. It can in turn be expedient if the point C is located at a corner of the cuboid movement range. For example, starting from one of the points A or B, the user can move the sample region in the z direction to reach a point which he establishes as point C. Proceeding from the three established points A, B, and C, the graphic user interface defines the cuboid movement volume.

After definition of the cuboid movement volume, the control unit of the microscope system activates the movement unit in a predetermined manner so that the sample region defined in this way is scanned. For example, first images of sections in one x-y plane are recorded, then in a plane parallel to this x-y plane, and so on until the entire scanning volume is scanned. An image is generated at each scanning position, the recorded images at the various scanning positions are superimposed and compiled to form an overall image of the sample region.

It is apparent to a person skilled in the art that by inputting three points in the space of a coordinate system, other predetermined movement volumes can also be defined. In principle, nearly arbitrary geometric bodies can be predetermined by definition of three boundary points of this body. A cuboid movement volume is generally most expedient in the practice of the microscope systems having microscope tables movable in the x-y directions and focusing units movable in the z direction.

Furthermore, it is not absolutely necessary that the three specified points A, B, and C are all located in or on the sample region to be imaged. For example, the point C in the above-described example of the definition of a cuboid movement range can be placed in a height (z coordinate) which ensures that all z coordinates of the sample region to be imaged are acquired. For this purpose, the point C can be set somewhat higher than the sample actually extends. The same observations apply in a fully analogous manner to the points A and B.

A further advantageous option for the definition of a cuboid movement range is described hereinafter.

In this further option, it is sufficient to input only two points A and C in the coordinate system displayed by the graphic user interface. For this purpose, the graphic user interface is configured in such a way that it considers the two input points as boundary points of a cuboid movement range. In an advantageous manner, the two points A and C define corner points opposite to one another of the cuboid movement volume, more precisely they form the starting point and end point of a spatial diagonal of the cuboid movement volume. More detailed explanations of this embodiment are also found in the exemplary embodiments at the end of the description.

Finally, reference is made to a further advantageous option for the definition of a cuboid movement range or more generally an arbitrary predefined movement volume. For this purpose, the graphic user interface can be configured in such a way that starting from a point A input in the displayed coordinate system, a predefined volume outline is displayed in the coordinate system, by means of which the movement volume is defined or which defines the movement volume. For example, a cuboid volume outline can be displayed in the coordinate system, at one corner of which, for example, the input point A is located. Such a design is reasonable, for example, if sample regions of equal or similar dimensions are to be examined in chronological sequence, so that the movement volume changes little. In this case, the specification of a single corner point or boundary point (point A) of this movement volume can be sufficient for the definition thereof.

Furthermore, the graphic user interface can be configured in such a way that a surface grid or spatial grid made up of the approach points corresponding to the sections to be imaged is displayed in the coordinate system, in which the movement volume is contained. For example, a cuboid spatial grid can be displayed in the coordinate system, at one corner of which, for example, the point A is located. The approach points corresponding to the sections are marked in the spatial grid.

In general, it is advantageous if the defined movement volume is displayed in the coordinate system, for example, in the form of a volume outline or spatial grid which illustrates the boundaries of the movement range. It can also be reasonable if the maximum possible movement volume or a maximum movement range is displayed in the coordinate system. The maximum possible movement volume is established by the system parameters of the microscope table and the focusing unit, thus by the maximum respective movement distances in the x, y, and z directions. In this design, the user can see how far away he is located from the boundaries of the maximum possible movement volume.

Recordings of sections of the sample are frequently already made to find the sample region of interest to be imaged. The recordings can already have occurred beforehand or can occur during the definition of the movement volume. Such images or also recorded image sequences in the z direction can be displayed by the graphic user interface in a separate display region or—for example semi-transparently—in the coordinate system, for example, to facilitate the definition of the movement volume for the user.

In one advantageous embodiment, the graphic user interface is configured in such a way that after definition of the movement volume, it can be modified or redefined by inputting at least one further point. For example, by selecting and inputting a further point D, which is located outside the defined movement volume, the movement volume can be expanded, while this movement volume can be reduced in size by inputting a further point D, which is located inside a defined movement volume. It is in particular expedient here if the input further point D forms a new boundary point of the newly defined, in particular expanded or reduced movement volume. This new boundary point can in particular in this case be a new edge point or corner point, for example, of a cuboid movement range. In this embodiment, it can also be expedient if the graphic user interface is configured in such a way that by selecting or clicking a boundary point of the displayed defined movement volume, it can be pulled apart or reduced in size in a defined manner, in particular while maintaining the cuboid shape. As soon as the movement volume is modified as desired, the user confirms this by an input (for example releasing the clicked boundary point) at the new point D.

The invention furthermore relates to a method for imaging at least one region of a sample by means of a microscope system, wherein a section of the sample region to be imaged located in an observation beam path of an image generating unit of the microscope system is imaged by means of the image generating unit, the section to be imaged is moved by means of a movement unit of the microscope system into the observation beam path of the image generating unit, a movement range corresponding to the sample region to be imaged is established by at least one user input in a graphic user interface of the microscope system, wherein the user interface displays a coordinate system and the movement range is defined in the form of a movement volume by inputting at least one point (A, B, C, D) in the coordinate system, and wherein the movement unit is activated by a control unit of the microscope system as a function of the defined movement range in such a way that a predetermined set of sections is approached within the defined movement range and imaged by the image generating unit.

Reference is expressly made to the explanations of the microscope system according to the invention with respect to the method according to the invention, its embodiments, and its advantages.

According to one advantageous embodiment, at least one of the at least one point (A, B, C, D) to be input is selected in such a way that it is located on or in the sample region to be imaged.

According to one advantageous embodiment, the movement volume is defined by the graphic user interface by the input of at least three points (A, B, C), wherein the three points (A, B, C) are used as boundary points of the movement volume.

According to a further advantageous embodiment, a Cartesian x-y-z coordinate system is used as the displayed coordinate system.

In a further advantageous embodiment, first a rectangular movement range is defined by the graphic user interface as the movement range if a first and a second point (A, B) in a common plane are input in the coordinate system displayed by the graphic user interface, and subsequently a cuboid movement volume is defined as the movement range if a third point (C) outside the plane extending through the first and second points (A, B) is input in the same displayed coordinate system. The initially selected plane can be the xy plane which is located in parallel to the table surface of the microscope table. However, for example, the xz plane or the yz plane, which are each perpendicular to the table surface of the microscope table, can also be selected as the starting surface. The third spatial direction is then selected using the third point (C).

In a further advantageous alternative embodiment, the input first, second, and/or third point (A, B, C) are used as boundary points of the cuboid movement volume by the graphic user interface.

In a further advantageous embodiment, a cuboid movement volume is defined by the graphic user interface as the movement range in that a first and a second point (A, C) are input in the displayed coordinate system, wherein the first and/or the second point are used as boundary points of the cuboid movement volume, in particular as starting and end points of a spatial diagonal of this cuboid volume.

In a further advantageous alternative embodiment, a surface grid or spatial grid is displayed using the graphic user interface in the coordinate system made up of the approach points corresponding to the sections to be imaged, in which the movement volume is contained.

In general, it is expedient if the defined movement volume is displayed in the coordinate system using the graphic user interface.

In a further advantageous embodiment, the maximum possible movement volume is displayed in the coordinate system using the graphic user interface.

In a further advantageous embodiment, already imaged sample regions are displayed using the graphic user interface. These already imaged sample regions can be used as a guide for a user upon the input of the selection points for the desired movement volume. For example, the already imaged sample regions can be displayed as semitransparent planes or volumes in the coordinate system.

In a further advantageous embodiment, a changed movement volume is redefined or modified in the graphic user interface after definition of the first movement volume by inputting at least one further point (D).

In a further advantageous embodiment, the at least one further input point (D) is used as a new boundary point of the redefined movement volume by the graphic user interface.

The invention finally relates to a computer program having program code, wherein when it is executed on a processing unit of a microscope system according to the invention, a method according to the invention is carried out. Furthermore, the invention relates to a corresponding computer program product having a computer program stored thereon having program code, which, when it is executed on a processing unit of a microscope system according to the invention, carries out a method according to the invention. The computer program can be downloaded or uploaded as such or stored or temporarily stored on a computer program product. Volatile or nonvolatile storage media come into consideration as the computer program product, such as USB stick, or RAM or ROM memories of known types. The mentioned processing unit of a microscope system according to the invention can be the control unit or a part of this control unit of the microscope system.

Further advantages and embodiments of the invention result from the description and the appended drawing.

The above-mentioned features and the features to be explained hereinafter are usable not only in the respective specified combination, but also in other combinations or alone, without leaving the scope of the present invention.

The invention is schematically illustrated in the drawing on the basis of an exemplary embodiment and is described hereinafter with reference to the drawing.

The figures are described universally, identical reference signs identify identical elements. Firstly, an embodiment of a graphic user interface 130 for establishing a movement range or scanning range corresponding to a sample region to be imaged by user inputs to be explained is to be described on the basis of FIGS. 1 to 5. The graphic user interface 130 is displayed on a display 131 or monitor or display system, wherein a coordinate system 132 is displayed on the display 131 in the graphic user interface 130. In the present exemplary embodiment, it is a Cartesian coordinate system having x, y, and z axes. 135 identifies the maximum possible movement range as is predetermined by the maximum and minimum positions of an x-y microscope table of the microscope system, which is displaceable in the x and y directions.

Figure 2:
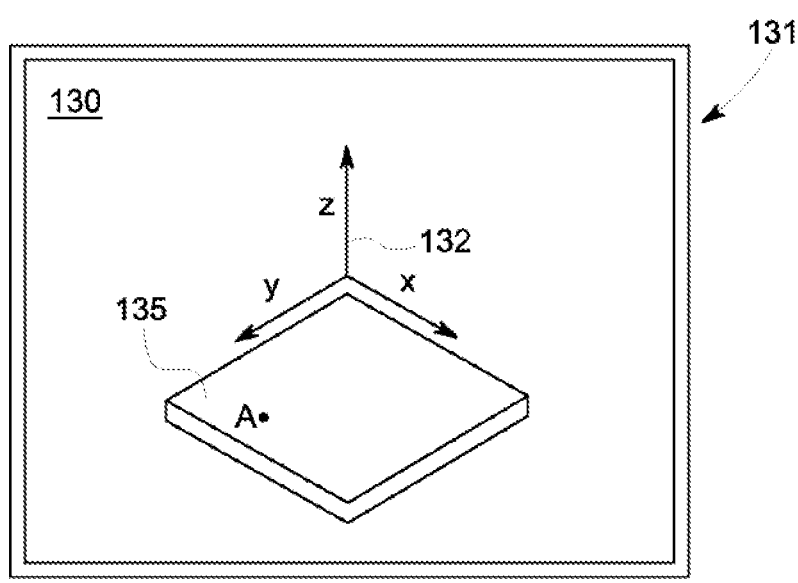
FIG. 2 schematically shows at least one detail of a graphic user interface of a microscope system according to the invention in a further view.

FIG. 2 shows the graphic user interface 130 after input of a point A by a user. This point A is the present focus position here, the corresponding image of the section of the sample associated with the point A is displayed, for example, in another region of the graphic user interface 130 or on another display region of the display 131, or on a separate display.

Figure 3:
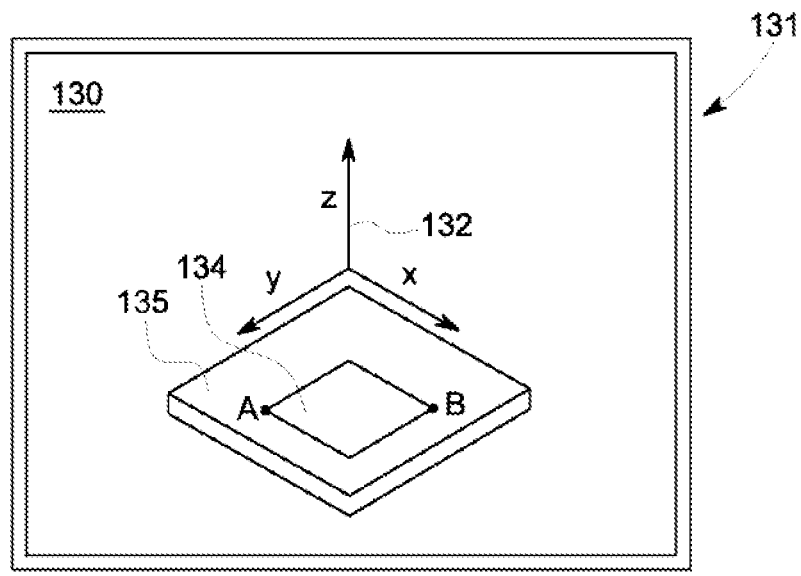
FIG. 3 schematically shows at least one detail of a graphic user interface of a microscope system according to the invention in a further view.

In a further step, shown in FIG. 3, a user inputs a second point B in the same x-y plane. Advantageously (but not necessarily), the section of the sample corresponding to the point B is moved into the focus of the observation beam path of the image generating unit of the microscope system and a corresponding image is generated. In this way, the user can check whether the point B is still in the sample region of interest or is still within the sample. The coordinates of the points A and B can be described as follows: $A=(x_A, y_A, z_1)$; $B=(x_B, y_B, z_1)$. After confirmation by the user, first a rectangular movement range 134 is defined in the graphic user interface 130, wherein the points A and B in this exemplary embodiment form corner points opposite to one another of the rectangular movement range 134. The rectangular movement range 134 extends in the x direction between the coordinates $x_A$ and $x_B$ and in the y direction between the coordinates $y_B$ to $y_A$.

Figure 4:
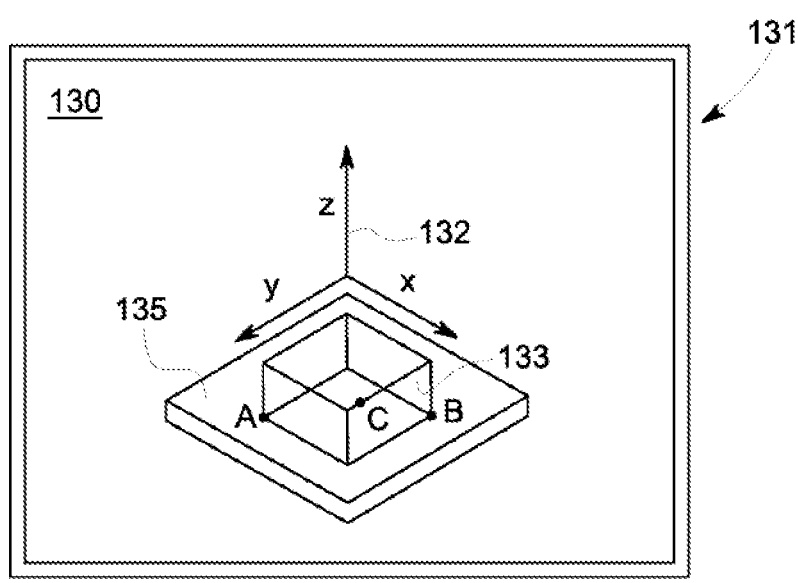
FIG. 4 schematically shows at least one detail of a graphic user interface of a microscope system according to the invention in a further view.

In a next step, shown in FIG. 4, by inputting a further point C in the same displayed coordinate system 132, the scanning range is defined in the form of a movement volume 133. For this purpose, only one point C is to be input, which is outside the x-y plane extending through the points A and B. This point C can be represented by its coordinates as C=($x_C$, $y_C$, $z_C$). The graphic user interface 130 is configured in such a way that an x-y plane at the height of the coordinate $z_C$ is spanned in parallel to the rectangular movement range 134, from which a cuboid movement volume 133 may be defined as the scanning volume. In the exemplary embodiment shown according to FIG. 4, the point C is located on an edge of this cuboid movement volume 133.

Figure 5:
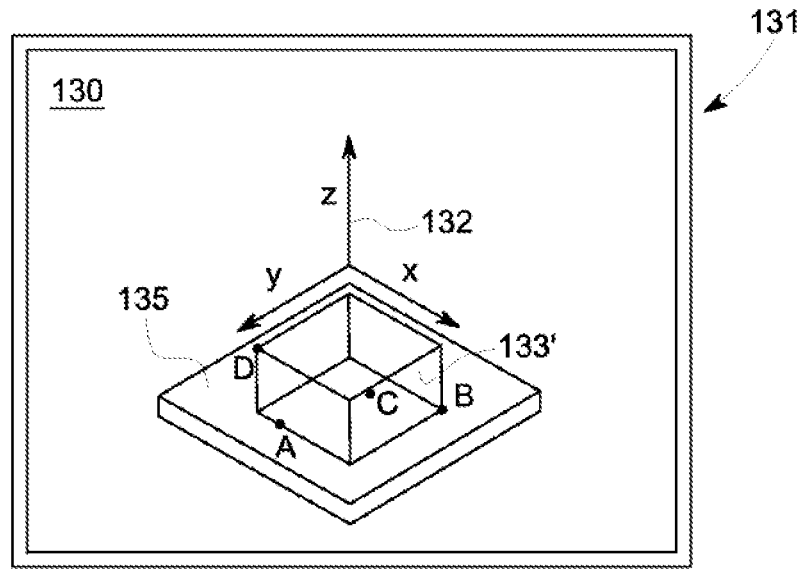
FIG. 5 schematically shows at least one detail of a graphic user interface of a microscope system according to the invention in a further view.

Finally, FIG. 5 shows a possibility for the modification of the movement volume 133. In this case, by inputting a further point D, which is located outside the movement volume 133 first defined according to FIG. 4, a new, modified movement volume 133' is defined. The point D may be described by the coordinates ($x_D$, $y_D$, $z_D$). The resulting expanded movement volume 133' is defined in the graphic user interface 130 in such a way that the movement volume extends from the smallest x value of the input points to the greatest x value of the input points, from the smallest y value of the input points to the greatest y value of the input points, and finally from the smallest z value of the input points to the greatest z value of the input points. In the exemplary embodiment according to FIG. 5, the movement volume 133' extends in the x direction from $x_D$ to $x_B$, in the y direction from $y_B$ to $y_D$, and in the z direction from $z_1$ to $z_D$.

Upon the selection of the points C and/or D, the respective corresponding section of the sample can expediently be moved into the focus of the observation beam path of the image generating unit of the microscope system to display corresponding images of the sections to a user. In this way, for example, it can be checked in a simple manner whether the point D still corresponds to a point within the sample region of interest to be imaged or within the sample.

After definition of the movement volume 133 or 133' via the graphic user interface 130, the sample scan begins, for example, at the coordinate $z_1$. The corresponding x-y rectangular surface is then scanned, which takes place in lines or in a meandering shape, for example. Images of the corresponding sections of the sample are recorded here at predefined coordinates. Subsequently, in a parallel scanning plane at another z coordinate, scanning is carried out in the same way and images are recorded, and so on until a last rectangular scanning region is reached at the coordinate $z_D$. After this last scanning plane is scanned, the recorded images can be processed. The images of an x-y plane are typically compiled to form a mosaic image, so that an image of the corresponding sample surface in the relevant plane results. Overall, in this way a z stack is obtained, thus an image stack of images which in turn can also be processed into a three-dimensional image of the corresponding sample volume.

Figure 6:
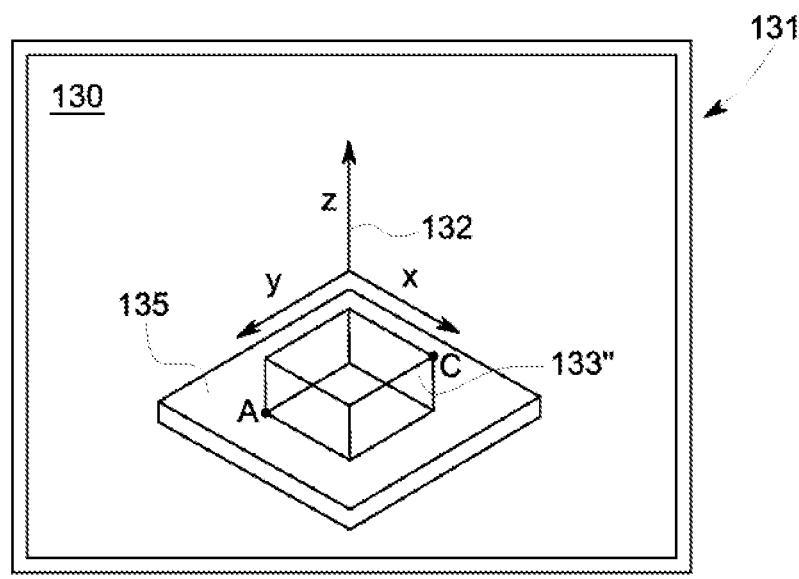
FIG. 6 schematically shows at least one detail of a graphic user interface of a microscope system according to the invention in an alternative embodiment.

FIG. 6 shows a further alternative for defining a cuboid movement volume when a user inputs a first point A and a second point C in the coordinate system 132 displayed in the graphic user interface 130. The points A and C form boundary points of the cuboid movement volume in this case, here—for better comprehension of the underlying principle—two corner points opposite to one another of the cuboid movement volume 133". The points A and C thus form the two end points of the spatial diagonal of the cuboid which establishes the movement volume 133". The two points A and C are established analogously to the above-described procedure. It is solely to be ensured that the points A and C are not located in the same x-y plane, since otherwise only a two-dimensional, rectangular movement range would be defined. It is again expedient if the points A and C are located in or on the sample region to be imaged.

After the two points A and C are input, a processing unit of the microscope system 100 calculates the cuboid movement volume 133" and displays it in the graphic user interface. The processing unit can also at least partially be part of the user interface or can be provided separately, for example, in the display unit or a graphic card or finally can in turn be part of a more comprehensive processing unit, which is arranged in the control unit 140 or another component of the microscope system 100. The coordinates of the points A and C can be represented by ($x_A$, $y_A$, $z_A$) and ($x_C$, $y_C$, $z_C$), respectively. The cuboid movement range 133" extends in the x direction from $x_A$ to $x_C$, in the y direction from $y_C$ to $y_A$, and in the z direction from $z_A$ to $z_C$.

After definition of the cuboid movement range 133", the scan with image generation takes place in the same way as already described above on the basis of FIGS. 1 to 5.

Figure 7:
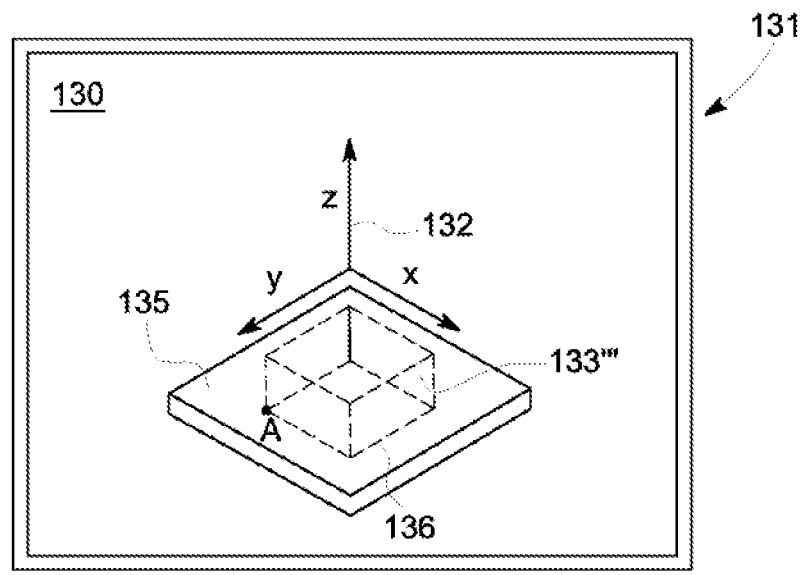
FIG. 7 schematically shows at least one detail of a graphic user interface of a microscope system according to the invention in another alternative embodiment.

FIG. 7 in turn shows an alternative possibility for establishing a movement range 133''' corresponding to the sample region to be imaged, wherein in this case the graphic user interface 130 is configured in such a way that by input of a single point A by a user in a coordinate system 132 displayed on the graphic user interface 130, a spatial grid or volume outline 136 is displayed originating from the point A in the coordinate system 132, by means of which the movement volume 133''' is defined.

In the exemplary embodiment illustrated in FIG. 7, a cuboid movement volume 133''' of predetermined dimensions is generated at a predetermined point, originating from point A here, and displayed in the graphic user interface 130 on the display 131. The user can now confirm the proposed spatial grid or volume outline 136 by input, so that this spatial grid 136 determines the cuboid movement volume 133'''. It can also be provided that a user can perform a modification of the spatial grid 136 in an analogous procedure to the exemplary embodiment according to FIG. 5. This can be carried out by inputting a further point (corresponding to point D in FIG. 5), which is located outside or inside the spatial grid 136 and is defined as the new boundary point or corner point of a new movement volume. As a further alternative, the spatial grid 136 can be clicked at a specific point, for example at a corner point, and enlarged or reduced in size by known mouse control by means of pulling.

Alternatively or additionally, the displayed volume outline 136 can also be used or understood as a spatial grid. In this case, the approach positions corresponding to the sections to be imaged can advantageously be displayed in the spatial grid 136 as grid points. In this way, the user receives a rapid overview of the arrangement of the sections which are used to image the sample region.

In a comprehensive, advantageous embodiment, after input of the at least one point A, B, C, or D, the input point is graphically highlighted in the coordinate system 132. This can be colored or by way of a thicker or blinking point, for example.

After definition of a suitable movement volume 133', the scan with image recording is carried out analogously to the above-described exemplary embodiments.

Figure 8:
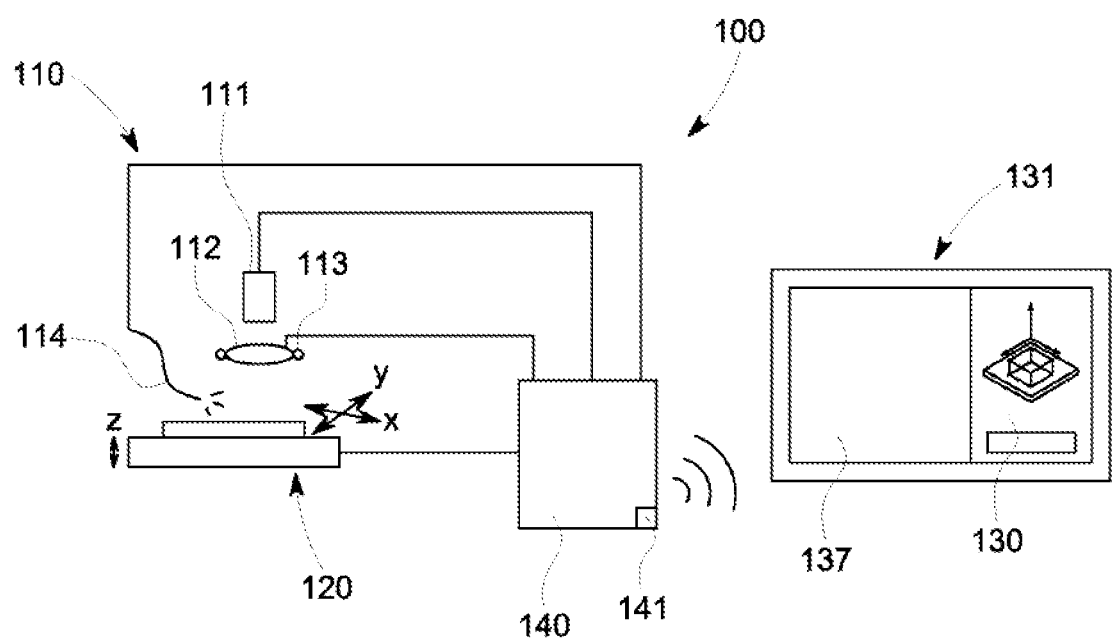
FIG. 8 schematically shows an embodiment of a microscope system according to the invention.
Figure 9:
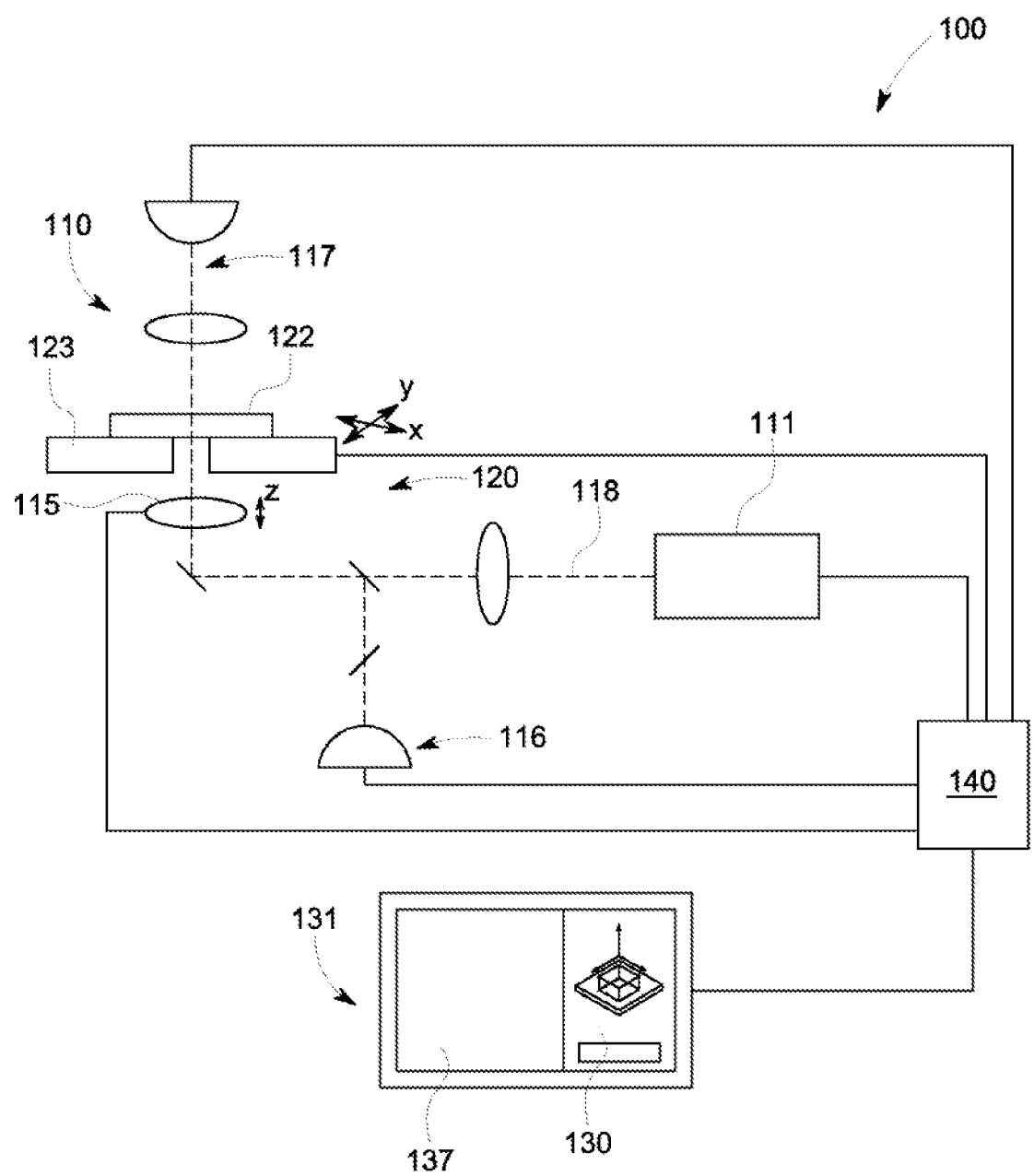
FIG. 9 schematically shows a further embodiment of a microscope system according to the invention.

FIGS. 8 and 9 show examples of specific embodiments of a microscope system 100. The microscope system 100 is shown very simplified, since components known as such from the prior art are not to be explained in greater detail here. The microscope system 100 includes an image generating unit 110, a movement unit 120, a control unit 140, and a graphic user interface 130. The control unit 140 can comprise a processing unit. However, the processing unit can also be arranged in another component of the microscope system 100. The image generating unit 110 is shown in FIG. 8 on the basis of the components microscope objective 112 and camera 111. A gooseneck light 114 and a ring light 113 guided in a ring shape around the objective 112 are used for illumination. The gooseneck light 114 and the ring light 113 can alternately be activated individually or in combination. This enables illumination from arbitrary illumination directions at arbitrary illumination angles. This is advantageous in the case of samples and observed objects having pronounced topology, in order to more clearly image structures of the sample or the observed object.

In this exemplary embodiment, the movement unit 120 essentially includes an x-y-z microscope table, which can be moved in all three spatial directions. A displacement of the objective 112 in the z direction can thus be omitted. The microscope table 121 is activated to move the sample in the x-y plane and to focus on a section of the sample by movement in the z direction. The sample itself is located on a sample holder 122 on the microscope table 121. The activation of the microscope table 121 is carried out by a control unit 140. As shown, the control unit 140 also activates further components, such as objective 112, ring light 113, camera 111, and gooseneck light 114. In this way, the desired parameters of the illumination and the camera can be set suitably. The definition of the scanning range and the following scan with image generation is also controlled via the control unit 140 together with the graphic user interface 130. In this exemplary embodiment, the control unit 140 is wirelessly connected to the graphic user interface 130, wherein suitably a WLAN connection 141 (Wi-Fi) is used. Alternatively, of course, a wired connection is also possible. In principle, the WLAN connection enables a spatial separation of the graphic user interface 130 from the remaining components of the microscope system 100. For this purpose, it is displayed, for example, on a display 131 of a tablet computer, which is connected by means of WLAN to the microscope system 100.

The display 131 shows the graphic user interface 130 similarly to the above-described exemplary embodiments, wherein a coordinate system is displayed for the definition of a movement volume. For example, indications according to FIGS. 1 to 7 are displayed on the display 131. As is apparent from FIG. 8, in addition to the graphic user interface 130, the display 131 shows a further larger display region 137, on which expediently the section is imaged which is presently in the focus of the image generating unit 110. This facilitates the navigation in the sample for a user and thus the identification of the sample region to be imaged. In this way, for example, according to the exemplary embodiment of FIGS. 1 to 4, a user can identify a sample region of interest and define a corresponding movement volume 133. After definition of the movement volume 133 in the graphic user interface 130, the control unit 140 controls the scan by activating the movement unit 120 and the image generation synchronized therewith by activating the image generating unit 110. After scanning an x-y plane, the processed image is displayed, for example, in the display region 137. This applies for further x-y planes until the entire defined z range is scanned. A calculation of a three-dimensional image of the imaged sample region can then take place, wherein a corresponding 3D display can in turn take place in the display region 137.

FIG. 9 schematically shows a further embodiment of a microscope system 100 with the option of incident light and transmitted light illumination. The components known as such of such a microscope system are again only to be mentioned briefly. The microscope system 100 has an image generating unit 110, a movement unit 120, a control unit 140, and a graphic user interface 130. The image generating unit 110 comprises as essential components a microscope objective 115 movable in the z direction and deflection elements and lenses (not identified in greater detail) and a camera 111 arranged in the observation beam path 118. The incident light illumination unit arranged on the objective side is identified by 116. Its light is guided via a semi-transmissive beam splitter to the objective 115.

The generated illumination beam path is conducted via deflection elements and the objective 115 onto the sample. Light originating from the focus of a section of the sample is conducted in the reverse direction by the objective 115 and further optical elements in the form of the observation beam path 118 to the camera 111, in which the generation of an image of the section takes place. The sample itself is located on a sample holder 122 on an x-y microscope table 123. In this case, the x-y adjustment of the microscope table 123 and the focusing drive of the objective 115 in the z direction are used as the movement unit 120 (cf. the double arrows with the directions x, y, z).

Furthermore, a transmitted light illumination unit 117 is shown, the light of which is transmitted through the sample and then reaches the objective 115. The transmitted light illumination unit 117 has a further lens (not shown in greater detail) for generating a transmitted light illumination beam path, which illuminates the sample on the sample holder 122, wherein transmitted light is received by the objective 115 and conducted in the form of an observation beam path 118 to the camera 111. In this way, a sample can be observed and imaged using the microscope system 100 shown here in incident light and/or transmitted light illumination. The corresponding image generation is activated via the control unit 140, which activates (at least) the components of the transmitted light illumination unit 117, microscope table 123, camera 111, incident light illumination unit 116, focusing drive of the objective 115. Furthermore, the control unit 140 has a wired connection in the case shown to the display 131 and/or the graphic user interface 130. Of course, alternatively a WLAN connection is also possible here, as was explained in conjunction with FIG. 8.

The graphic user interface 130 also displays a coordinate system 132 for the definition of a movement volume here. The corresponding display and the corresponding process for the definition of such a movement volume can correspond to the embodiments according to FIGS. 1 to 7. In addition to the graphic user interface 130, the display 131 again has a larger display region 137, on which respective generated images can be displayed. For example, images of sections can be depicted here during the identification of the sample region of interest, whereby the selection of suitable points for defining a movement volume is facilitated. After defining a movement range, a scan with image generation takes place in the procedure already explained on the basis of FIG. 8. For this purpose, for example, with fixed focus position of the objective 115, the microscope table 123 is moved according to a predetermined pattern in the x-y direction until an image of an x-y plane of the sample region to be imaged is provided. This can in turn be displayed in the display region 137. Subsequently, a further x-y scan takes place with changed z position of the objective 115. This method is repeated until the entire z range of the movement volume is processed. A three-dimensional sample image can be calculated from the resulting image stack (z stack), which is in turn displayed, for example, on the display region 137 as a 3D image.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 microscope system
110 image generating unit
111 camera
112 objective
113 ring light
114 gooseneck light
115 objective
116 incident light illumination unit
117 transmitted light illumination unit
118 observation beam path
120 movement unit
121 x-y-z microscope table
122 sample holder
123 x-y microscope table
130 graphic user interface
131 display
132 coordinate system
133, 133', 133", 133'" movement volume, movement range
134 rectangular movement range
135 maximum movement range
136 spatial grid
137 display regions
140 control unit
141 WLAN connection
A, B, C, D point

The invention claimed is:

1. A microscope system for imaging at least one region of a sample, comprising:
   an image generating unit for microscopic imaging of a section of a sample region to be imaged acquired in an observation beam path;
   a movement unit configured to move the section to be imaged into the observation beam path of the image generating unit;
   a graphic user interface displayed on a display for receiving, before imaging, at least one user input for establishing a movement range corresponding to the sample region to be imaged, the at least one user input comprising a first point, a second point, and a third point, the graphic user interface being configured to display a coordinate system and, after input of the first point, the second point, and the third point in the displayed coordinate system, establish the movement range as a fixedly outlined movement volume shown on the display; and
   a control unit configured to activate the movement unit as a function of the fixedly outlined movement volume so as to approach a set of sections corresponding to the fixedly outlined movement volume in succession in the observation beam path for subsequent imaging of each section by the image generating unit.

2. The microscope system of claim 1, wherein at least one of the first point, second point, and third point is located on or in the sample region to be imaged.

3. The microscope system of claim 1,
   wherein the first point, second point, and third point form boundary points of the fixedly defined movement volume.

4. The microscope system of claim 3, wherein the graphic user interface is configured such that first a rectangular movement range is defined as the movement range when the first point and the second point, which are in a common plane, are input in the coordinate system displayed in the graphic user interface, and subsequently a cuboid movement volume is defined as the movement range when the third point, which is outside the plane extending through the first point and second point, is input in the same coordinate system displayed in the graphic user interface.

5. The microscope system of claim 4, wherein the graphic user interface is configured such that the input first point, second point, and/or third point form boundary points of the cuboid movement volume.

6. The microscope system of any claim 3, wherein the graphic user interface is configured such that a cuboid movement volume is defined as the movement range when the first point and the second point are input in the coordinate system displayed in the graphic user interface, and
   wherein the cuboid movement volume is defined such that the first point and/or the second point form boundary points of the cuboid movement volume comprising a starting point and an end point of a spatial diagonal of the cuboid movement volume.

7. The microscope system of claim 1, wherein the graphic user interface is configured such that the displayed coordinate system is a Cartesian x-y-z coordinate system.

8. The microscope system of claim 1, wherein the graphic user interface is configured such that the fixedly outlined movement volume is displayed in the coordinate system.

9. The microscope system of claim 8, wherein the graphic user interface is configured such that a surface grid or spatial grid made up of the approach points corresponding to the sections to be imaged is displayed in the coordinate system, in which the fixedly outlined movement volume is contained.

10. The microscope system of claim 1, wherein the graphic user interface is configured such that a maximum possible movement range is displayed in the coordinate system.

11. The microscope system of claim 1, wherein the graphic user interface is configured such that, after previously performed definition of the fixedly outlined movement volume, a modified movement volume is redefined by inputting at least one further point.

12. The microscope system of claim 11, wherein the graphic user interface is configured such that the at least one further input point forms a new boundary point of the modified movement volume.

13. The microscope system of claim 1, wherein the sections moved into the observation beam path are each arranged in a focus of the image generating unit.

14. A method for imaging at least one sample region of a sample by a microscope system, comprising:
moving a section of the at least one sample region to be imaged by a movement unit of the microscope system into the observation beam path of an image generating unit of the microscope system;
establishing a movement range corresponding to the at least one sample region to be imaged by at least one user input comprising a first point, a second point, and a third point into a graphic user interface of the microscope system, the graphic user interface displaying a coordinate system, and the movement range being defined as a fixedly outlined movement volume shown on a display of the graphic user interface by inputting the first point, the second point, and the third point in the coordinate system; and
activating the movement unit by a control unit of the microscope system as a function of the fixedly outlined movement volume such that a predetermined set of sections is approached and imaged by the image generating unit within the fixedly outlined movement volume.

15. The method of claim 14, wherein at least the first point, the second point, or the third point is selected such that at least the first point, the second point, or the third point is located on or in the sample region to be imaged.

16. The method of claim 14,
wherein the first point, second point, and third point are used as boundary points of the fixedly outlined movement volume.

17. The method of claim 16, wherein first a rectangular movement range is defined using the graphic user interface as the movement range when the first point and the second point, which are in a common plane, are input in the coordinate system displayed by the graphic user interface, and subsequently a cuboid movement volume is defined as the movement range when the third point, which is outside the plane extending through the first point and second point, is input in the same coordinate system displayed in the graphic user interface.

18. The method of claim 17, wherein the first point, second point, and/or third point are assigned as boundary points of the cuboid movement volume using the graphic user interface.

19. The method of claim 14, wherein a Cartesian x-y-z coordinate system is used as the displayed coordinate system.

20. The method of claim 14, wherein a cuboid movement volume is defined using the graphic user interface as the movement range when the first point and the second point are input in the displayed coordinate system, and
wherein the first point and/or the second point are used as boundary points of the cuboid movement volume so as to form a starting point and an end point of a spatial diagonal of the cuboid movement volume.

21. The method of claim 14, wherein the fixedly outlined movement volume is displayed in the coordinate system using the graphic user interface.

22. The method of claim 21, wherein a surface grid or spatial grid made up of the approach points corresponding to the sections to be imaged is displayed in the coordinate system, in which the fixedly outlined movement volume is contained, using the graphic user interface.

23. The method of claim 14, wherein a maximum possible movement volume in the coordinate system is displayed using the graphic user interface.

24. The method of claim 14, wherein already imaged sample regions or sections are displayed using the graphic user interface before or during a definition of the fixedly outlined movement volume in the coordinate system.

25. The method of claim 14, wherein after definition of the fixedly outlined movement volume, a modified movement volume is redefined by inputting at least one further point using the graphic user interface.

26. The method of claim 25, wherein the at least one further input point is acquired as a new boundary point of the modified movement volume using the graphic user interface.

27. The method of claim 14, wherein the sections moved into the observation beam path are each arranged in a focus of the image generating unit.

28. A computer program stored on a non-transitory computer-readable recording medium, the computer program having program code that upon execution on a processing unit of the microscope system of claim 1, carries out a method for imaging at least one region of the sample by the microscope system, the method comprising:
imaging the section of the sample region to be imaged located in the observation beam path of the image generating unit of the microscope system by the image generating unit;
moving the section to be imaged by the movement unit of the microscope system into the observation beam path of the image generating unit;
establishing the movement range corresponding to the sample region to be imaged by the at least one user input in the graphic user interface of the microscope system, the graphic user interface displaying the coordinate system and the movement range being defined as the fixedly outlined movement volume by inputting the first point, the second point, and the third point in the coordinate system; and
activating the movement unit by the control unit of the microscope system as a function of the fixedly outlined movement volume such that a predetermined set of sections is approached and imaged by the image generating unit within the fixedly outlined movement volume.

29. A computer program product stored on a non-transitory computer-readable recording medium, the computer program product having a computer program stored thereon having program code that upon execution of which on a processing unit of the microscope system of claim 1, carries out a method for imaging at least one region of the sample by the microscope system, the method comprising:

imaging the section of the sample region to be imaged located in the observation beam path of the image generating unit of the microscope system by the image generating unit;

moving the section to be imaged by the movement unit of the microscope system into the observation beam path of the image generating unit;

establishing the movement range corresponding to the sample region to be imaged by the at least one user input in the graphic user interface of the microscope system, the graphic user interface displaying the coordinate system and the movement range being defined as a fixedly outlined movement volume by inputting the first point, the second point, and the third point in the coordinate system; and activating the movement unit by the control unit of the microscope system as a function of the fixedly outlined movement volume such that a predetermined set of sections is approached and imaged by the image generating unit within the fixedly outlined movement volume.

* * * * *